United States Patent [19]
Vandemark et al.

[11] 3,835,913
[45] Sept. 17, 1974

[54] INVESTMENT CASTING

[75] Inventors: William Jacob Vandemark, Strongville; Michael Stuart Wood, Olmsted Falls, both of Ohio

[73] Assignee: Foseco International Limited, Birmingham, England

[22] Filed: Apr. 21, 1972

[21] Appl. No.: 246,204

[30] Foreign Application Priority Data
Apr. 22, 1971 Great Britain............... 10859/71

[52] U.S. Cl................ 164/35, 164/244, 164/249, 164/350, 164/361
[51] Int. Cl.............................................. B22c 9/02
[58] Field of Search ............ 164/36, 244, 246, 361, 164/34, 35, 350, 249

[56] References Cited
UNITED STATES PATENTS

| | | | |
|---|---|---|---|
| 1,421,988 | 7/1922 | Richards | 164/36 |
| 3,041,688 | 7/1962 | Wilder | 164/35 X |
| 3,094,751 | 6/1963 | Horton | 164/36 |
| 3,131,999 | 5/1964 | Suzuki et al. | 164/36 |
| 3,186,041 | 6/1965 | Horton | 164/36 |
| 3,249,972 | 5/1966 | Watts et al. | 164/36 X |
| 3,424,227 | 1/1969 | Watts et al. | 164/36 |
| 3,523,766 | 8/1970 | Markus et al. | 164/36 |
| 3,572,421 | 3/1971 | Mezey et al. | 164/244 |
| 3,598,167 | 8/1971 | Snyderman | 164/361 |
| 3,648,760 | 3/1972 | Cooper | 164/244 |

Primary Examiner—J. Spencer Overholser
Assistant Examiner—V. K. Rising
Attorney, Agent, or Firm—Cushman, Darby & Cushman

[57] ABSTRACT

In investment casting part or all of the usual central wax sump and feeder is replaced by a refractory sleeve of heat-insulating or exothermic material, into which one or more wax patterns are fitted.

1 Claim, 1 Drawing Figure

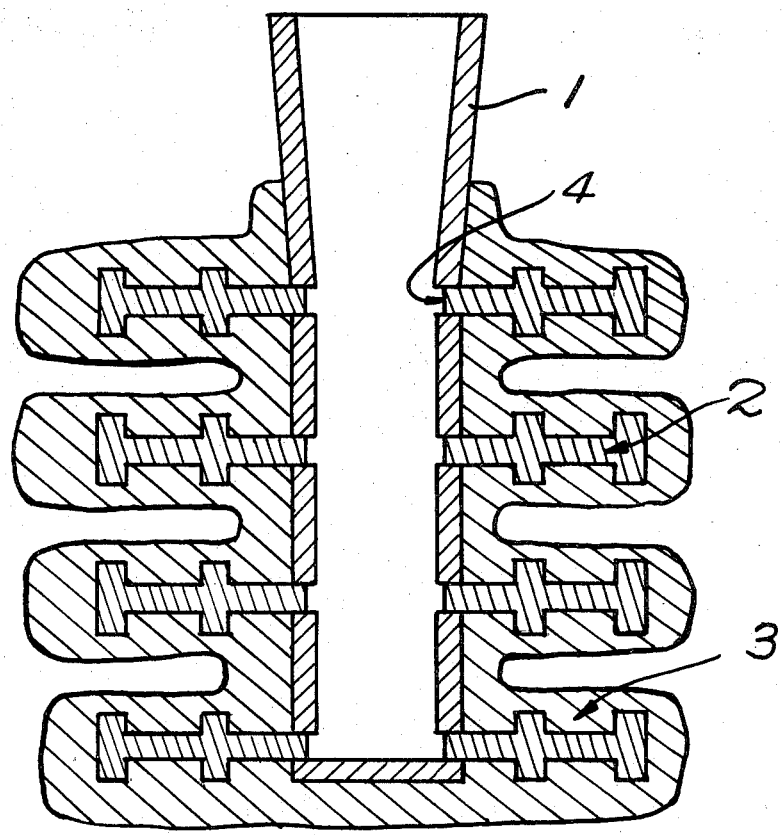

INVESTMENT CASTING

This invention relates to investment casting, and particularly to the use of refractory sleeves therein.

Investment casting is normally effected in the following fashion; a number of wax patterns of the articles to be cast are made up by any convenient method, (usually die moulded). These are then connected by lugs, referred to herein as ingate lugs, to a central sump or sprue which eventually acts as a feeder, made also of wax.

The assembly of patterns on a central sump is referred to as a "tree." The tree is then coated to form a refractory and/or ceramic shell over its surface. To achieve this the tree is dipped into a slurry consisting of a refractory material such as zircon, or alumina, and a binder therefor such as hydrolysed ethyl silicate or colloidal silica sol.

The tree is then withdrawn from the slurry and stuccoed with a granular refractory material such as molochite or mullite, often using a fluidized bed technique, and dried either by air drying, or more normally by chemical "drying" (i.e., in the case where the hydrolyzed ethyl silicate is used, exposing the tree to gassing by ammonia).

These steps of dipping and drying are repeated until the ceramic shell around the tree is of a sufficient thickness, usually between 3 and 16 mm thick, depending on the weight of the as cast assembly.

The tree, complete with the outer shell, is then placed in a furnace and heated, e.g., to 1,000°C, to remove all the wax, and to harden the ceramic coating. The mould is then ready for casting.

The foregoing method is of cource capable of considerable variation in detail within the general terms described above. For example expendable materials other than wax may be employed, e.g., other meltable materials, or materials which are destroyed by heat treatment, e.g., foamed polymer materials. Further, alternative forms of refractory or ceramic coating, using alternative refractory and alternative binding agents may be employed.

This process results in castings of a very high quality; however there are several disadvantages. In the first place it is necessary to provide a central sump of wax or other expendable material, and to affix the patterns thereto and this is time consuming. Furthermore the provision of the sump involves the use of quantities of wax, which must then be coated with a ceramic coating. Thus quantities of wax and the ceramic coating material are uselessly expended.

Furthermore the body of metal in the central sump must be sufficiently large to ensure adequate feeding of metal to the moulds and ehnce castings free from shrinkage defects. This is because the heat loss from the sump is high due to the poor insulation characteristics of the ceramic coating.

The present invention provides a method of overcoming some of the disadvantages of the prior art processes.

According to the present invention there is provided a process for the production of an investment casting mould which comprises making up one or more patterns of a mterial which is fusible or destructible by heat, which patterns have ingate lugs thereon, assembling the patterns on to a central sump, at least part of the sump being in the form of a refractory heat insulating and/or exothermic sleeve, coating the assembly so formed with a refractory ceramic material and heating to a temperature sufficient to melt and destroy the pattern material and to harden the coating, thereby to form a casting mould.

Preferably the whole of the sump is formed from a heat-insulating and/or exothermic sleeve, open at one end and having one or more apertures at or near its other end to receive ingate lugs on patterns. Less desirably, the sump may be formed of a heat-destructible or heatfusible portion adapted to receive the patterns, and a feeder sleeve portion made of a refractory heat-insulating and/or exothermic material.

In the preferred form of the invention, the pattern material is a wax and the heat treatment is effected at a temperature of about 1,000°C.

In one form of the invention use is made of a hollow refractory heat-insulating and/or exothermic sleeve having one end closed, and having in its wall one or more apertures in which are located the ingate lugs of the pattern or patterns. The position of these apertures will depend on the configuration and size of the patterns; conveniently the patterns may be located one above the other on the sleeve. The individual wax patterns may be located in the sleeve by extruding the pattern material through dies into the appropriate apertures.

When the pattern or patterns have been attached to such a sleeve, the whole tree is dipped in a slurry of refractory or ceramic material as in the prior art process as hereinbefore described. The tree need only be dipped in the slurry up to a level such that the patterns are completely covered; there is no need, because of the presence of the insulating and/or exothermic sleeve, for the ceramic coating to be coated over the entire sleeve, as the sleeve itself is sufficiently strong to withstand handling, and metallostatic pressure.

Sleeves suitable for use in the present invention are preferably made of a material able to withstand at least 1,000°C without deterioration.

Suitable compositions of this type, and which are in other ways particularly suitable for use in the present invention, are those made up of inorganic fibre and a binder, e.g., alumino-silicate or calcium silicate fibre and optionally a refractory filler, bonded with colloidal silica sol and optionally starch.

The diameter and thickness of the sleeve will vary according to the particular circumstance.

The process of the invention affords many advantages; the quantity of wax or other pattern forming material is reduced, as is the amount of material required to form the ceramic shell. When the wax patterns fit directly into a sleeve, the metal in each of the castings is fed via an insulating and/or exothermic material, on both sprue and ingate, so that directional solidification takes place, which gives greater directional strength. Furthermore, as the amount of metal in the sump is reduced, there is a valuable saving in metal. Further a consistent metal feed to each moulding cavity is ensured and the number of inclusions caused by shell material being washed into the mould is considerably reduced.

The FIGURE shows in section an investment casting mold according to the present invention. The sleeve 1 is formed from a heat insulating and/or exothermic material; the wax patterns are secured to the sleeve 1 by ingate lugs 4. The refractory coating 3 is produced in the normal fashion as previously described.

The following examples will serve to illustrate the invention.

EXAMPLE I

Eight patterns of a gear selector fork were made up in wax and attached by ingate lugs to a 3.5 cm diameter insulating sleeve closed at the lower end, and manufactured from a material of the following composition;

| | |
|---|---|
| Alumino-silicate fibres | 72% by weight |
| Starch | 8% by weight |
| Colloidal silica sol (30% by weight silica) | 20% by weight |

The tree so formed was dipped in a slurry of alumina in colloidal silica sol and afterwards dry stuccoed using granular molochite. The resultant coating was then allowed to air dry, and the process was repeated until a ceramic coating of 4mm thickness was spread over the patterns, up to a level just above the uppermost pattern.

The tree was then placed in a furnace at 1,000°C, and the wax thereby removed, and the ceramic shell hardened.

The resulting mould was then removed and was ready for use for casting gear selector forks.

EXAMPLE II

A 2.7 kg stainless steel turbine rotor, approximately 17 cm in diameter was cast using a direct feed method and 2.7 kg of feed metal. An 8 mm thick ceramic shell was produced by the same method as that described in Example I but employing a two-layer, insulating sleeve manufactured from a material of the following composition:

Metal-facing layer —

| | |
|---|---|
| alumino-silicate fibre | 62% by weight |
| alumina | 10% by weight |
| starch | 8% by weight |
| colloidal silica sol (30% by weight silica) | 20% by weight |

Back-up layer —

| | |
|---|---|
| calcium silicate fibre | 82% by weight |
| starch | 8% by weight |
| colloidal silica sol (30% by weight silica) | 10% by weight |

The facing layer comprised one-fifth of the total thickness of the sleeve.

The process normally used for casting the same stainless steel rotor required 3.6 kg of feed metal.

We claim as our invention:

1. In the production of an investment casting mold including the steps of making up one or more patterns of a material which is fusible or destructible by heat, which patterns have ingate lugs thereon, assembling the patterns onto a central sump by connecting said lugs to said sump to form a tree assembly, coating the tree assembly so formed with a refractory ceramic material and heating to a temperature sufficient to melt and destroy the pattern material and to harden the coating, thereby to form a casting mold, the improvement comprising using, as at least part of the sump, a refractory sleeve to which said lugs are connected to form said tree assembly, said sleeve being formed of a material selected from the group consisting of exothermic materials and heat-insulating materials comprising inorganic fiber and a binder and said refractory sleeve becoming at least partially covered with said coating of refractory ceramic material to form the casting mold as a result of said coating and heating steps, the whole of the sump being constituted by a sleeve, open at one end and having at least one or more ingate lug reception apertures at or near its other end.

* * * * *